May 24, 1960

R. A. CHAPELLIER 2,937,984

CONTROL ROD DRIVE

Filed Dec. 28, 1956

INVENTOR.
ROBERT A. CHAPELLIER

BY
*Eldon H. Luther*

ATTORNEY

United States Patent Office 2,937,984
Patented May 24, 1960

2,937,984
CONTROL ROD DRIVE
Robert A. Chapellier, Whitestone, N.Y., assignor, by mesne assignments, to the United States of America as represented by the United States Atomic Energy Commission
Filed Dec. 28, 1956, Ser. No. 631,294
7 Claims. (Cl. 204—193.2)

This invention relates to drive mechanism for obtaining a linear motion and has particular relation to a drive mechanism for the control rod of a nuclear reactor.

In normal operation the control rods of a reactor are moved rather slowly into and out of the reactor core to change the power level of the reactor as required. It is necessary, however to be able to rapidly scram the control rods or move them to their innermost position in the reactor core in the event of an emergency in order to quickly shut down the reactor. Therefore the drive for the control rods must be capable of providing the required movement of the rods to accurately position them during normal operation and also to provide the necessary quick action for scramming.

In the present invention the normal positioning of the control rods is effected through an electrical motor drive while the scramming is provided by means of unbalanced hydraulic forces. Briefly stated the invention comprises a reactor vessel containing a pressurized reactor coolant and upwardly from which extends a cylindrical housing that is open to the reactor vessel. In this housing there is provided an electric motor which is effective to axially move the control rod in the reactor vessel to accurately position the same during normal operation of the reactor. This motor is connected with the control rod through a sleeve-type piston positioned within the housing. This piston is driven or moved axially within the housing by a lead screw which is coaxial with and extends into the outer end of the piston and is in threaded engagement with this outer end. This lead screw is rotated by the electric motor and through rotation of this screw the piston is axially moved within the housing and accurately positioned as desired therewithin. The piston is surrounded by the pressurized fluid in the reactor with this fluid being conveyed upwardly through the center of passage of the piston and through passageways provided in the wall of the piston at its outer end so as to convey this fluid to the outer end of this piston around the threaded connection of the piston with the lead screw. The piston preferably fits rather loosely within the housing so that this pressurized fluid may be disposed between the piston and the housing. Thus the forces acting on the piston by means of this pressurized fluid are in counterbalancing relation. The piston and housing are constructed so as to form an annular chamber the outer end of which is bounded by the piston and the inner end of which is bounded by the housing. This chamber is normally filled with pressurized reactor fluid which is admitted to the chamber through the clearance between the piston and the housing. The flow path of this fluid into the chamber is substantially more restricted than the flow path of the fluid to the outer end of the piston so that if the pressure within this chamber were suddenly relieved by exhausting to atmosphere or a containment vessel there would be an unbalanced force acting on the piston due to the pressurized fluid acting against the outer end of the piston and tending to move the piston in an inward direction. The pitch of the lead screw is sufficiently steep so as to permit this hydraulic force to move the piston resulting in driving the motor through this lead screw. The pressure within the annular chamber is relieved through a suitable conduit which contains an electrically actuated valve. This valve is moved to its closed position when energized and occupies its open position when deenergized and the circuit for the valve and the motor contains switch mechanism organization so that the valve and motor may be simultaneously deenergized through this mechanism.

It is an object of this invention to provide an improved control rod drive wherein the control rod is positioned during normal operation of the reactor through one driving device and is scrammed in response to another driving device.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown in the accompanying drawing wherein.

Figure 2:
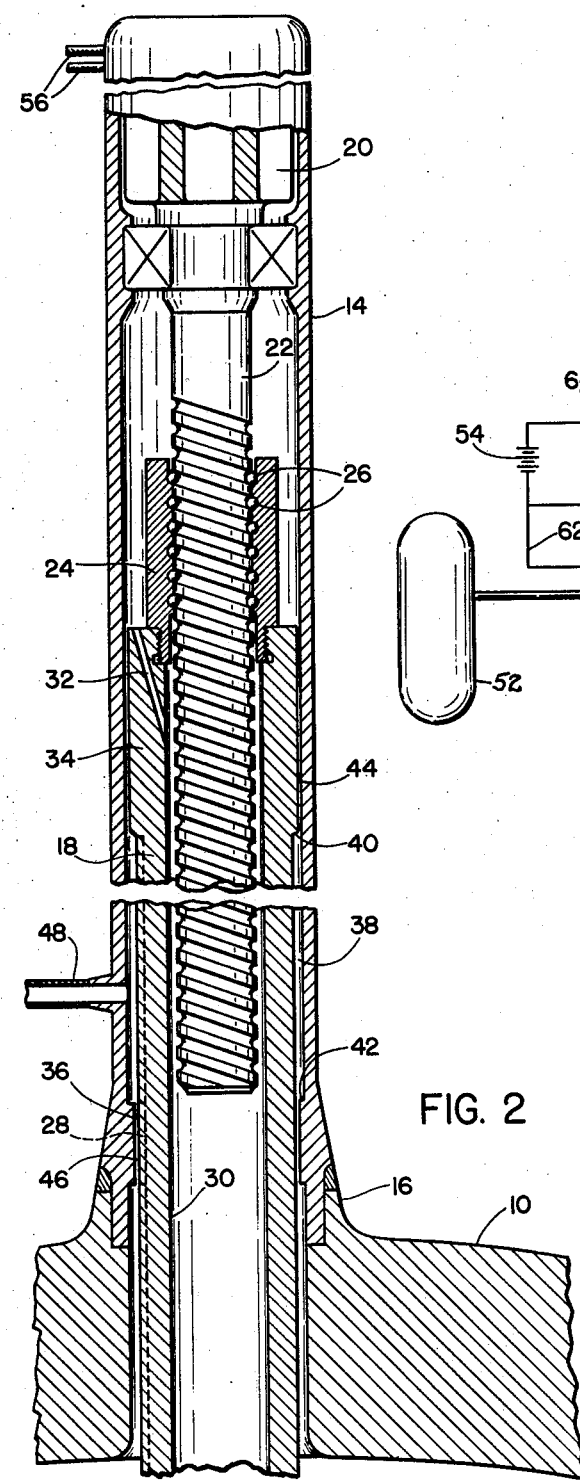
Fig. 2 is an enlarged detailed transverse sectional view of the control rod drive.

Referring now to the drawings, wherein like reference characters are used throughout to designate like elements, there is shown therein an illustrative and preferred embodiment of the invention which includes nuclear reactor vessel 10 of the type having a pressurized coolant contained therein surrounding a suitable core 11 and with the level of power output being controlled by means of control rods movable into and out of this core with the drive for but one such control rod being shown, it being understood that a multiplicity of control rods and drives would be employed in a reactor.

This control rod drive includes cylindrical housing 14 extending upwardly from the cover or closure 12 at the upper end of vessel 10 and which is received within and welded to nozzle 16 with the housing being open to the interior of the reactor vessel. Positioned within housing 14 in coaxial relation therewith is sleeve type piston 18 which extends downward into the reactor vessel and is connected to or is an extension of a control rod, not shown. This sleeve is moved axially up and down within housing 14 so as to accurately position the control rod as desired with this axial movement being produced through the reversible electric motor 20. The motor 20 is of the so-called "canned" type, immersed within the reactor coolant, and is connected to lead screw 22 to rotate this screw about its axis.

The rotation of lead screw 22 is effective to axially move piston 18 by reason of ball nut 24 formed at the upper or outer end of piston 18 and threadedly engaging the lead screw. This nut is comprised of ball bearings 26 retained in suitable sockets formed in the inner surface of the nut housing and disposed in a helical path so as to engage the thread of the lead screw as shown. Piston 18 is prevented from rotating about its axis relative to housing 14 through any suitable means, such as spline 28.

Figure 1:
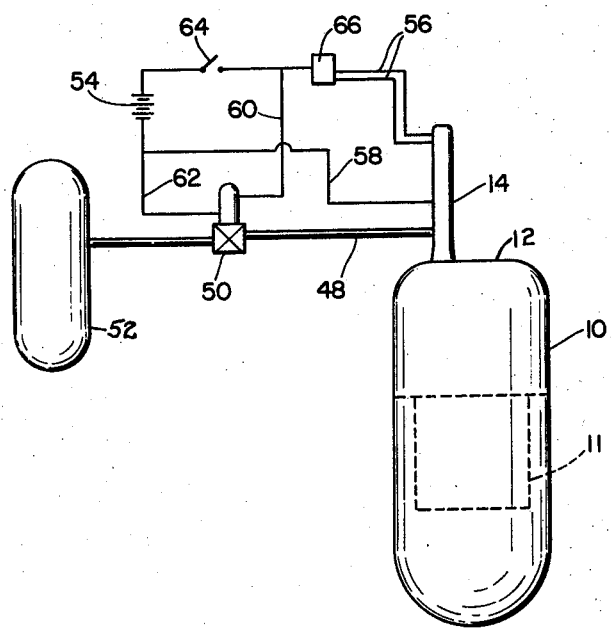
Fig. 1 is a diagrammatic view showing the control rod drive extending upwardly from the cover of a reactor vessel and showing the containment tank employed for scramming purposes and the electric circuit for the valve in the conduit leading to the tank and for the electric motor of the control rod drive.

Piston 18 is surrounded by the pressurized fluid from the reactor vessel with this fluid passing up through the center passage 30 of the sleeve type piston and through the bores 32 at its upper end. The pressurized fluid travels through the length of the housing 14 with the bores 32 permitting free flow of this fluid past ball nut 24 which, were it not for these bores 32, would offer a substantial resistance to the free flow of the fluid. The upper or outer end of piston 18 is enlarged as shown with the periphery of this enlarged portion being preferably slightly spaced from the inner surface of the housing to form a restricted annular passage 44. Below or inwardly of this enlarged head portion 34 of piston 18 the housing 14 is formed with a radially inwardly extending annulus or raised portion 36 which is also preferably slightly spaced from the piston so as to form an annular passage 46. Thus when piston 18 is in a position such as shown in Fig. 1 where head portion 34 is spaced outwardly of annulus 36, there is formed an annular chamber 38 bounded on its outer or upper end by shoulder 40 of enlarged head portion 34 of piston 18 and at its inner end by shoulder 42 of the annulus 36. The pressurized fluid from the reactor enters chamber 38 through the restricted annular passage at each end of the chamber. These restricted annular passages, identified as 44 and 46, have a total flow area which is much more restricted than the area of flow for conveying the pressurized fluid upwardly through the center of piston 18 and to the upper end of this piston. Thus if the pressure in chamber 38 is released there will be an unbalance in the hydraulic forces acting on the piston which will urge the piston inwardly into the reactor vessel.

This is accomplished through conduit 48 which communicates with chamber 38 and extends radially from housing 14. Fluid flow through this conduit is controlled by electrically actuated scram valve 50 and the conduit communicates with a containment vessel such as 52 or if desired may discharge to a suitable sump.

In normal operation valve 50 is closed so that the hydraulic forces acting on piston 18 counterbalance each other and piston 18 together with the control rod are slowly moved axially of housing 14 to accurately determined positions through motor 20 and lead screw 22. When an emergency occurs, so that it is necessary to scram the control rod, valve 50 is opened relieving the pressure in chamber 38 thereby producing a hydraulic force urging piston 18 inwardly. The drive between motor 20 and piston 18 is reversible. That is, the pitch of lead screw 22 is sufficiently steep so that this hydraulic force rapidly moves piston 18 to its innermost position rotating lead screw 22 and motor 20 as it moves to this position.

In order to insure that the drive will "fail safe," i.e., move to its innermost or scram position should there be a malfunction of valve 50, this valve is of the type that is moved to its closed position when its electric actuator is energized and automatically moves to the open position upon the deenergization of the actuator.

Both the motor and valves are controlled by a switch mechanism which simultaneously de-energizes both of these devices thereby insuring that power will not be applied to motor 20 when valve 50 is open since this would prevent the hydraulic scramming operation. As diagrammatically shown in Fig. 1, motor 20 and valve 50 are connected across a source 54 of potential by conductors 56 and 58 leading to motor 20 and conductors 60 and 62 leading to valve 50. In series with each of these circuits is the single switch 64 which, when closed, permits current to flow to motor 20 and valve 50 with motor 20 being controlled by control mechanism 66 which is effective to regulate the direction and amount of rotation of the motor. Thus when switch 64 is closed valve 50 is closed and motor 20 may be operated as desired through control device 66. When switch 64 is open valve 50 is moved to its open position to release the pressure in chamber 38 and the circuit to motor 20 is broken so that the motor is rendered inoperative.

Thus with the organization of this invention a control rod may be accurately positioned as desired through an electric motor drive and may be scrammed in an emergency through a hydraulic drive with this composite drive mechanism for the control rod being relatively simple in construction and positive in its action and having but one external conduit connected with it.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A nuclear reactor control rod drive for use with a reactor having a pressurized coolant comprising a housing extending from and open into a reactor vessel, a piston in and generally coaxial with said housing and surrounded by reactor coolant, a first passageway in said piston for conveying said coolant to the outer end of the piston for application against the outer end of said piston, said piston forming with said housing an annular chamber bounded on one end by a shoulder formed on the piston and on the other end by a shoulder formed on the housing, a relatively restricted second passageway for admitting said coolant to said chamber, motor means for moving said piston longitudinally within the housing, reversible transmission means between said motor means and said piston for transmitting drive from said motor means to said piston when the former is energized and drive back from said piston to said motor means when the latter is deenergized, and means for controllably and independently relieving the pressure in said annular chamber, thereby unbalancing the hydraulic forces on said piston with the resultant force being applied longitudinally.

2. In a nuclear reactor having a reactor vessel housing the core of the reactor and having a pressurized coolant contained therein, the combination of control rod drive means comprising an elongated housing extending from and open into the vessel, a piston disposed in said housing coaxial therewith for movement axially therewithin and having a passageway extending therethrough conveying the reactor coolant to the outer end thereof, said piston forming with said housing a chamber bounded at least in part at one end by said piston and at the other end by said housing, a restricted passage admitting the pressurized coolant to said chamber, said piston being constructed and arranged so that the forces exerted against said piston axially thereof by said coolant are normally substantially balanced, means for independently relieving the pressure from said chamber to thereby unbalance these forces and create a predetermined force urging said piston axially of said housing, a lead screw received within said piston in coaxial relation therewith and extending from said piston, said lead screw being operatively connected to a reversible motor for rotating it in either direction and being in threaded engagement with said piston with the pitch of said threads being such as to permit said predetermined force to move said piston.

3. The organization of claim 2 wherein said means for relieving the pressure from said chamber includes an electrically operated valve effective when energized to prevent release of the pressure but when deenergized permit such release, and wherein the reversible motor is electrically controlled, being inoperative when deenergized, and including control means operative to effect simultaneous deenergization of said electrically operated valve and said electrically controlled motor.

4. The combination of a vessel containing a fluid under pressure, an elongated cylindrical housing extending therefrom, a piston in the form of a cylindrical sleeve slidably disposed in coaxial relation with said housing and forming with said housing an annular chamber the outer end wall of which is formed by said piston, a lead screw telescoped in said piston and extending from the outer end thereof, a reversible electrical motor contained within said housing and operatively connected with the outer end of said lead screw, said lead screw threadedly engaging said piston and being effective to move the piston axially of the housing in response to rotation of said screw, a passageway conveying the fluid under pressure from the vessel to the outer end of said piston, passageway means conveying said fluid under pressure into said annular chamber and being substantially restricted relative to the aforementioned passageway, a conduit communicating with and leading from said chamber operative to rapidly relieve the pressure therein with the unbalanced force thus produced being effective to axially move said piston, electrically controlled valve means in said conduit for controlling flow therethrough, said valve occupying a closed position when energized and an open position when deenergized, electrical switch means operative to simultaneously deenergize said electric motor and said valve.

5. In combination a vessel containing a pressurized fluid, a cylindrical housing extending upwardly from said vessel and open thereinto, a piston in the form of a cylindrical sleeve disposed in said housing in coaxial relation therewith said piston forming with said housing an annular chamber bounded at its outer end by said piston and at its inner end by said housing so that fluid pressure in said chamber exerts a force on said piston tending to move it in an axial direction outwardly of said housing, said piston normally being surrounded by said pressurized fluid so that the forces exerted on the piston by said fluid counterbalance each other, a threaded shaft coaxial with and extending into the outer end of the piston, electric motor means within said housing outwardly of said piston and connected with the outer end of said shaft to rotate the shaft in either direction about its axis, the outer end of said piston being provided with a nut means engaging the threads on said shaft so that as said shaft is rotated the piston is moved in an axial direction, a passageway conveying said pressurized fluid from the interior of said piston to its outer end, said piston being loosely received in said housing thereby providing an annular passageway for conveying said pressurized fluid to said annular chamber with this latter passageway being substantially more restricted than the former, a valved conduit communicating with said chamber for controllably and independently relieving the pressure from said chamber with the unbalanced force thus created being sufficient to move the piston inwardly through the interconnection of the nut with the shaft.

6. The combination of a reactor vessel containing a pressurized coolant, means for axially moving a control rod in said vessel, said means including a housing open to the interior of said vessel, piston means disposed in said housing for longitudinal movement therewithin, said piston means having opposed surfaces facing into first and second separate chambers, respectively, within said housing, means providing connection from said pressurized coolant within said vessel to both of said chambers and thereby said opposed surfaces with one connection to said first chamber being more restrictive to flow of said coolant than the connection to said second chamber, means operative to reduce controllably the pressure within one of said chambers to create thereby a predetermined hydraulic force urging said piston longitudinally of said housing in a predetermined direction, and motor means including reversible transmission drive means for moving said piston means longitudinally within said housing in either direction when said motor means is energized and permitting movement of said piston means in response to unbalanced hydraulic forces by said pressurized coolant when said motor means is deenergized.

7. The combination of a reactor vessel containing a pressurized coolant, means for axially moving a control rod in said vessel, said means including a housing open to the interior of said vessel, piston means disposed in said housing for longitudinal movement therewithin, said piston means having opposed surfaces facing into first and second separate chambers, respectively, within said housing, means providing connection from said pressurized coolant within said vessel to both of said chambers and said opposed surfaces with the connection to said first chamber being more restrictive to flow of said coolant than the connection to said second chamber, means operative to reduce controllably the pressure within one of said chambers to create thereby a predetermined hydraulic force urging said piston longitudinally of said housing in a predetermined direction, motor means including reversible transmission drive means for moving said piston means longitudinally within said housing in either direction when said motor means is energized and permitting movement of said piston means in said predetermined direction in response to unbalanced hydraulic forces by said pressurized coolant when said motor means is deenergized, and means for simultaneously deenergizing said motor means and causing energization of said operative means to relieve said first chamber of pressurized coolant to permit emergency movement of said piston means in response to unbalanced hydraulic forces therein.

References Cited in the file of this patent

UNITED STATES PATENTS 2,660,026   Geyer _____ Nov. 24, 1953

FOREIGN PATENTS 204,766   Australia _____ Nov. 28, 1956